United States Patent
Kelly

(10) Patent No.: US 7,184,599 B2
(45) Date of Patent: Feb. 27, 2007

(54) IMAGE COMPRESSION IN RETAINED-MODE RENDERER

(75) Inventor: Gregg Richard Kelly, Liberty Grove (AU)

(73) Assignee: Canon Kabushiki Kaisha, Toky (JP)

( * ) Notice: Subject to any disclaimer, the term of this patent is extended or adjusted under 35 U.S.C. 154(b) by 699 days.

(21) Appl. No.: 10/391,605

(22) Filed: Mar. 20, 2003

(65) Prior Publication Data
US 2003/0219163 A1 Nov. 27, 2003

(30) Foreign Application Priority Data
Mar. 20, 2002 (AU) ................................ PS1276

(51) Int. Cl.
*G06K 9/36* (2006.01)
(52) U.S. Cl. .................. 382/233; 382/232; 382/245
(58) Field of Classification Search ................ 382/232, 382/233, 245, 164, 254, 298; 345/592, 606, 345/629, 581, 613; 341/50, 51, 60, 63; 358/426.13; 375/240.23; 714/794
See application file for complete search history.

(56) References Cited

U.S. PATENT DOCUMENTS

| | | | |
|---|---|---|---|
| 5,796,872 A | 8/1998 | Shimomura | 382/237 |
| 5,903,671 A | 5/1999 | Toda | 382/236 |
| 6,624,823 B2* | 9/2003 | Deering | 345/613 |
| 6,721,455 B1* | 4/2004 | Gourdol | 382/232 |
| 6,721,456 B1* | 4/2004 | Aschenbrenner et al. | 382/233 |
| 6,747,659 B2* | 6/2004 | Deering | 345/581 |
| 6,747,663 B2* | 6/2004 | Oberoi et al. | 345/606 |
| 6,980,220 B1* | 12/2005 | Politis | 345/592 |

FOREIGN PATENT DOCUMENTS

| | | |
|---|---|---|
| EP | 1 113 395 A2 | 7/2001 |
| WO | WO 97/07635 | 2/1997 |
| WO | WO 01/77996 A1 | 10/2001 |

* cited by examiner

*Primary Examiner*—Anh Hong Do
(74) *Attorney, Agent, or Firm*—Fitzpatrick, Cella, Harper & Scinto

(57) ABSTRACT

A method (200) and apparatus (100) for compressing an image is disclosed. The image is provided as one or more runs of pixels on a scanline basis. The runs of pixels represent one or more graphical objects forming the image. For each scanline of the image, pixel difference values between each adjacent pixels of at least one run of pixels of the scanline is determined. The pixel difference values for the run of pixels are then compared to predetermined difference values. One or more coded bytes are determined for the run of pixels depending on the comparison, each of the coded bytes representing a difference value between at least two adjacent pixels of the run of pixels. The one or more coded bytes are then stored as a compressed representation of the run of pixels corresponding to the scanline of the image.

11 Claims, 12 Drawing Sheets

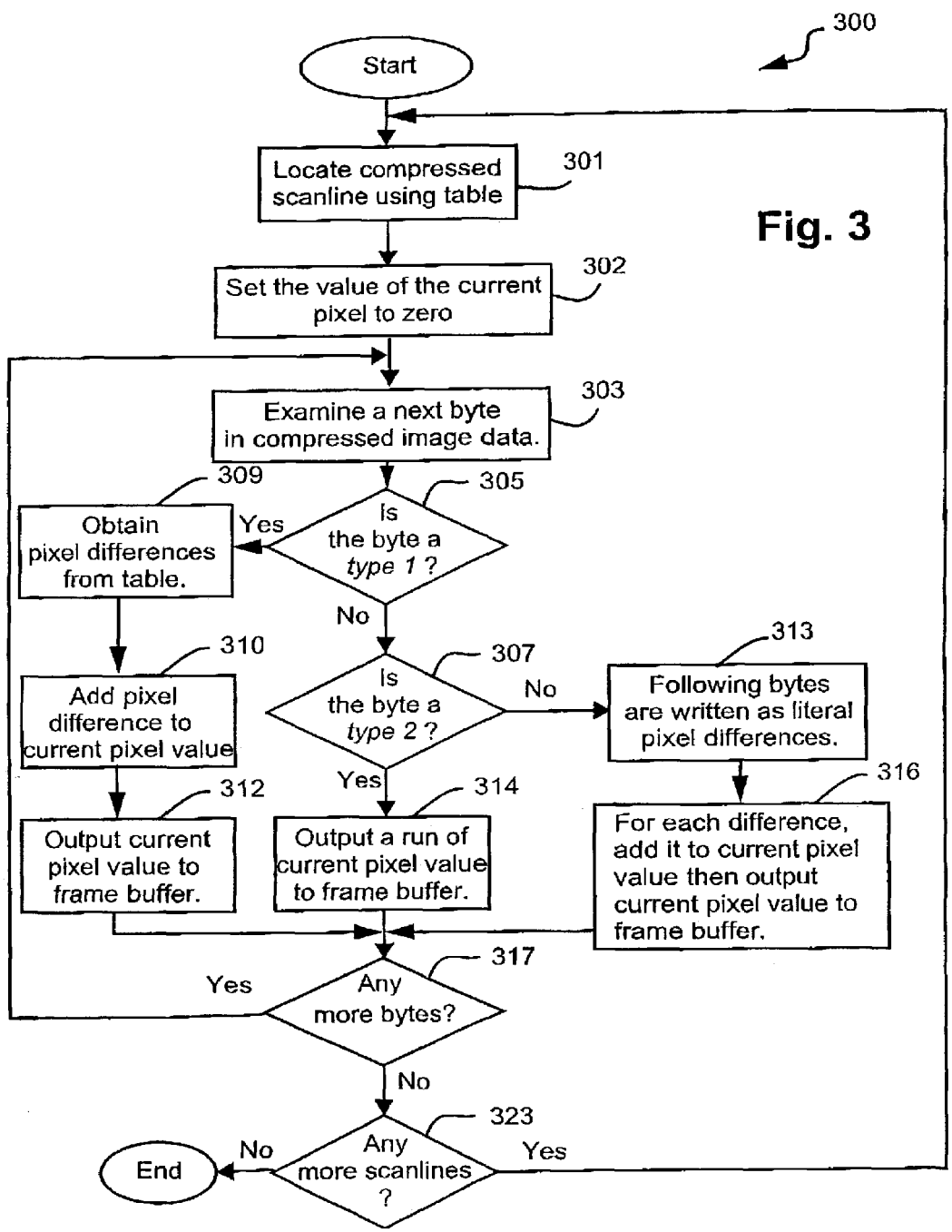

IMAGE COMPRESSION IN RETAINED-MODE RENDERER

CROSS-REFERENCE TO RELATED PATENT APPLICATIONS

This application claims the right of priority under 35 U.S.C. § 119 based on Australian Provisional Patent Application No. PS 1276, filed Mar. 20, 2002, which is incorporated by reference herein in its entirety as if fully set forth herein.

TECHNICAL FIELD OF THE INVENTION

The present invention relates generally to image compression and, in particular, to a method of compressing image data. The invention also relates to a computer program product including a computer readable medium having recorded thereon a computer program for compressing image data.

BACKGROUND

Computer generated images are typically made up of many differing components or graphical elements which are rendered and composited together to create a final image. In recent times, an "alpha channel" (also known as a "matte", an "opacity channel", or simply "opacity") has been commonly used in generating images. The alpha channel contains information regarding the transparent nature of each element. The alpha channel is stored alongside each instance of a colour, so that, for example, a pixel-based image with opacity stores an alpha (or opacity) value as part of the representation of each pixel. An element without explicit alpha channel information is typically understood to be fully opaque within some defined bounds of the element, and assumed to be completely transparent outside those bounds.

An expression tree offers a systematic means for representing an image in terms of its constituent elements and which facilitates later rendering. Expression trees typically comprise a plurality of nodes including leaf nodes, unary nodes and binary nodes. Nodes of higher degree, or of alternative definition may also be used. A leaf node, being the outer most node of an expression tree, has no descendent nodes and represents a primitive constituent of an image. Unary nodes represent an operation which modifies the pixel data coming out of the part of the tree below the unary operator. Unary nodes include such operations as colour conversions, convolutions (blurring etc) and operations such as red-eye removal. A binary node typically branches to left and right subtrees, wherein each subtree is itself an expression tree comprising at least one leaf node. Binary nodes represent an operation which combines the pixel data of its two children to form a single result. For example, a binary node may be one of the standard "compositing operators" such as OVER. IN, OUT, ATOP aid alpha-XOR, examples of which and others are seen in FIG. 7.

Several of the above types of nodes may be combined to form a compositing tree 800, as shown in FIG. 8, representing an image where a representation of each portion of the image is retained at each of the nodes (e.g. 801) For the compositing tree 800, the result of the left-hand side of the tree 800 is retained at node 803, and may be interpreted as a colour converted image being clipped to spline boundaries. A path region represented by these spline boundaries is stored at the node 801 of the tree 800 and the resulting region representing the clipped image is stored at node 803. The clipped image region is composited with a second image which is stored at node 805.

Although the non-transparent area of a graphical element may of itself be of a certain size, it need not be entirely visible in a final image, or only a portion of the element may have an effect on the final image. For example, assume an image of a certain size is to be displayed on a display. If the image is positioned so that only the top left corner of the image is displayed by the display device, the remainder of the image is not displayed. The final image as displayed on the display device thus comprises the visible portion of the image, and the invisible portion in such a case need not be rendered.

Another way in which only a portion of an element may have an effect on a final image is when the portion is obscured by another element. For example, a final image to be displayed (or rendered) may comprise one or more opaque graphical elements, some of which obscure other graphical elements. Hence, the obscured elements have no effect on the final image.

Many conventional compositing models consider each node of a compositing tree to be conceptually infinite in extent. Therefore, to construct the final image, such a conventional system applies a compositing equation at every pixel of the output image. Interactive frame rates of the order greater than 15 frames per second can be achieved in such a system, since pixel operations are quite simple and can be highly optimised. These highly optimised pixel operations can be fast enough to produce acceptable frame rates without requiring complex code. However, this is certainly not always true in a compositing environment.

The per-pixel cost of compositing can be quite high since an image is typically rendered in 24-bit colour (e.g. Red, Green, Blue (RGB)) in addition to an 8-bit alpha channel, thus giving 32 bits per pixel. Each compositing operator has to deal with each of the four channels. Therefore, an approach of completely generating every pixel of every required frame when needed is highly inefficient.

The basic shape of operands to compositing operators in most current rendering systems is a rectangle or bounding box, regardless of the actual shape of the object being composited. Thus, it is a relatively simple operation to write an operator which composites within the intersection area of two bounding boxes. However, as a bounding box typically does not accurately represent the actual bounds of a graphical element, such an operation can result in a lot of unnecessary compositing of completely transparent pixels over completely transparent pixels. Furthermore, when the typical make-up of a composition is examined, it can be noticed that areas of many graphical elements are completely opaque. This opaqueness can be exploited during the compositing operation. However, these areas of complete opaqueness are usually non-rectangular and so are difficult to exploit using compositing arguments described by bounding boxes. If irregular regions are used for exploiting opaque objects when compositing, then these regions can then be combined in some way to determine where compositing should occur. Furthermore, if any such region is known to be fully transparent or fully opaque, further optimisations are possible.

Most conventional rendering systems fail to exploit similarities in a composition of graphical elements between one frame and the next. Since it is rare for every graphical element of an image to change from frame to frame, large areas of a compositing tree typically remain unchanged. Thus, it is only necessary to render those components of an image that have been altered by a particular action. If incremental changes are made to a compositing tree, then only a reduced amount of updating is necessary to affect the change.

Many current graphical systems use what is known as an 'immediate mode' application program interface (API). This means that for each frame to be rendered, a complete corresponding set of rendering commands is sent to the API. However, sending the complete set of rendering commands is somewhat inefficient in a compositing environment since, as discussed above, large sections of the compositing tree typically remain unchanged from one frame to the next, but are completely re-rendered anyway in an immediate mode API. On the other hand, a 'retained mode' API provides a complete compositing tree on a per-frame basis. In this case, a user provides an initial compositing tree, and then modifies the tree for each frame in order to effect a change. Changes which can be made to the tree include geometrically transforming part or all of the tree, modifying the tree structure (unlinking and linking subtrees), and modifying attributes (eg: colour) of individual nodes. Note that such modifications may not necessarily mean that the tree structure, for example as seen in FIG. 8, will change where only the attributes of an individual node have been modified.

A retained mode rendering system uses the combination of a number of techniques and assumptions to provide high quality images and high frame rates. Firstly, a retained mode rendering system uses irregular regions to minimise per-pixel compositing. For example, if one graphical element is on top of another, then pixel compositing is only needed inside the area where the two elements intersect. Having the ability to use irregular regions gives the ability to narrow down areas of interest much more accurately. Secondly, if an opaque graphical element is composited with another element using the OVER operator, for example, then the opaque graphical element completely obscures what the element is composited onto (inside the opaque element's area). This is a very useful property since it means that no expensive pixel compositing is required to achieve the output pixel within the area of overlap since the pixel value is the same as that at the equivalent point on the opaque element. Opaque elements induce similar behaviour in most of the compositing operators described above. Thirdly, in a retained mode rendering system it is often necessary to repeatedly redraw the compositing tree as graphical elements of the tree are updated. Therefore, an assumption is made that in the transition from one frame to the next, only part of the compositing tree will change. This particular property can be exploited by caching away expensive-to-generate information regarding a composition so that the cached information can be re-used in a subsequent redraw operation from one frame to the next. Examples of expensive-to-generate information are regions of interest (e.g. boundaries of areas of intersection between graphical elements etc); pixel data (i.e. representing expensive composites etc); and topological relationships between graphical elements.

Caching away expensive-to-generate information regarding a composition of graphical elements, in order that the information can be reused in subsequent redrawing operations, can greatly improve processing and thus redrawing speed. However, if too much memory is used for storing the information, the speed of redrawing can actually be decreased due to increased memory paging.

One known method for compositing graphical objects in a retained mode rendering system, uses image data compression and decompression techniques in order to reduce the amount of memory required for storing images and in particular expensive-to-generate information. However, conventional compression techniques, such as the Joint Photographics Expert Group (JPEG) standard, tend to be too slow and thus, the processing speed lost due to compressing and decompressing images can outweigh any advantage gained through performing such compression and decompression.

Accordingly, an improved compression method for use within a rendering system, and in particular a retained mode rendering system, is clearly needed.

SUMMARY OF THE INVENTION

It is an object of the present invention to substantially overcome, or at least ameliorate, one or more disadvantages of existing arrangements.

According to one aspect of the present invention there is provided a method of compressing an image, said image being provided as one or more runs of pixels on a scanline basis, said runs of pixels representing one or more graphical objects forming said image, said method comprising the steps of:

for each scanline of said image.

determining pixel difference values between each adjacent pixel of at least one run of pixels of said scanline;

comparing said pixel difference values for said run of pixels to predetermined difference values using a predetermined hash function;

determining one or more coded bytes for said run of pixels depending on said comparison, each of said coded bytes representing a difference value between at least two adjacent pixels of said run of pixels; and storing said one or more coded bytes as a compressed representation of said run of pixels corresponding to said scanline of said image.

According to another aspect of the present invention there is provided a method of creating an image, said image to be formed by rendering and compositing at least a plurality of graphical objects on a scanline basis, each said object having a predetermined outline and at least one of said objects being a compressed representation, said compressed representation comprising one or more coded bytes corresponding to one or more compressed scanlines of said image, said method comprising the steps of:

dividing a space in which said outlines are defined into a plurality of regions, each said region being defined by at least one region outline substantially following at east one of said predetermined outlines or parts thereof and each of said regions having a corresponding compositing expression, wherein at least one of said regions has one or more associated compressed scanlines;

for each compressed scanline associated with said at least one region, determining an offset value associated with said compressed scanline;

accessing one or more stored coded bytes corresponding to said offset value, determining pixel difference values for each of said stored coded bytes; and determining a decompressed run of pixels for each of said stored coded bytes using said pixel difference values, in order to create said image.

According to still another aspect of the present invention there is provided an apparatus for compressing an image, said image being provided as one or more runs of pixels on a scanline basis, said runs of pixels representing one or more graphical objects forming said image, said apparatus comprising:

pixel difference determining means for determining pixel difference values between each adjacent pixel of at least one run of pixels for at least one scanline of said image;

comparison means for comparing said pixel difference values for said run of pixels to predetermined difference values using a predetermined hash function;

coded byte determining means for determining one or more coded bytes for said run of pixels depending on said comparison, each of said coded bytes representing a difference value between at least two adjacent pixels of said run of pixels; and storage means storing said one or more coded bytes as a compressed representation of said run of pixels corresponding to said scanline of said image.

According to still another aspect of the present invention there is provided a program for compressing an image, said image being provided as one or more runs of pixels on a scanline basis, said runs of pixels representing one or more graphical objects forming said image, said program comprising code for performing the following steps:

for each scanline of said image,
  determining pixel difference values between each adjacent pixel of at least one run of pixels of said scanline;
  comparing said pixel difference values for said run of pixels to predetermined difference values using a predetermined hash function;
  determining one or more coded bytes for said run of pixels depending on said comparison, each of said coded bytes representing a difference value between at least two adjacent pixels of said run of pixels; and
storing said one or more coded bytes as a compressed representation of said run of pixels corresponding to said scanline of said image.

Other aspects of the invention are also disclosed.

BRIEF DESCRIPTION OF THE DRAWINGS

One or more embodiments of the present invention will now be described with reference to the drawings, in which:

FIG. 3 is a flow diagram showing a method of decompressing image data;

DETAILED DESCRIPTION INCLUDING BEST MODE

Figure 1:
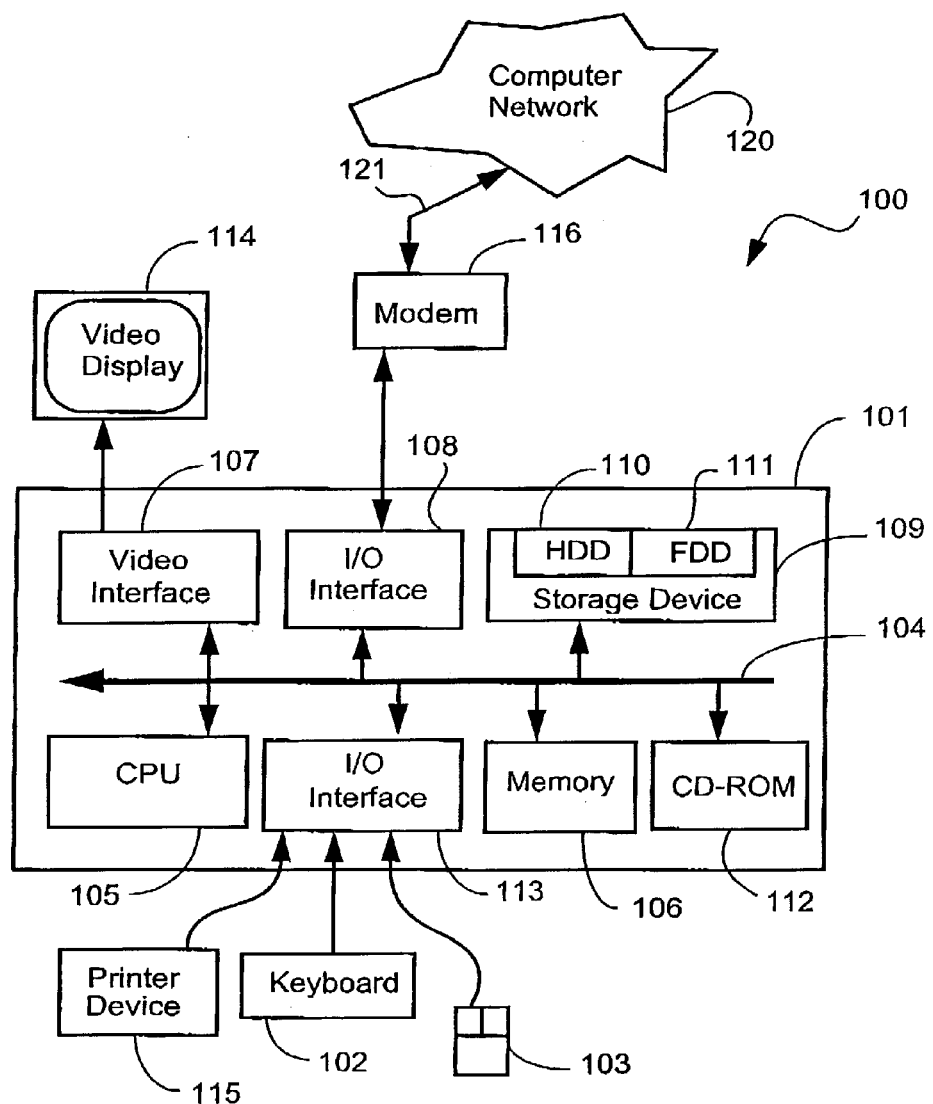
FIG. 1 is a schematic block diagram of a general-purpose computer upon which arrangements described can be practiced.

Where reference is made in an, one or more of the accompanying drawings to steps and/or features, which have the same reference numerals, those steps and/or features have for the purposes of this description the same function(s) or operation(s), unless the contrary intention appears.

A method 200 of compressing image data is described below with reference to FIG. 2. In the method 200, an image is compressed on a scanline basis utilizing a scanline table. The method 200 is particularly suitable for images which consist of regions of uniform or blended colour and supports transparency and partial transparency in images, by utilising an alpha (or opacity) channel associated with each graphical element of an image. The method 200 results in compressed image data, which is configured as a stream of bytes representing one or more portions of an original image. The compressed image data requires much less memory storage space than the original image data. The method 200 is particularly advantageous in a retained mode rendering system, as described above.

As will be explained in detail below, the configuration of the compressed image data output stream, resulting from the method 200, comprises a scanline table followed by a series of pixel difference runs. Each pixel difference run represents one or more differences between adjacent input pixel values of a corresponding input pixel scanline. The preferred pixel format is "Red, Green, Blue, Alpha (RGBA), at 32-bits per pixel". However, any suitable pixel format can be used in the method 200.

A method 300 of decompressing image data, which was compressed according to the method 200, is also explained below, with reference to FIG. 3. Further, a method 500 of compositing graphical elements, using the methods 200 and 300, is explained below with reference to FIG. 5.

Figure 2A:
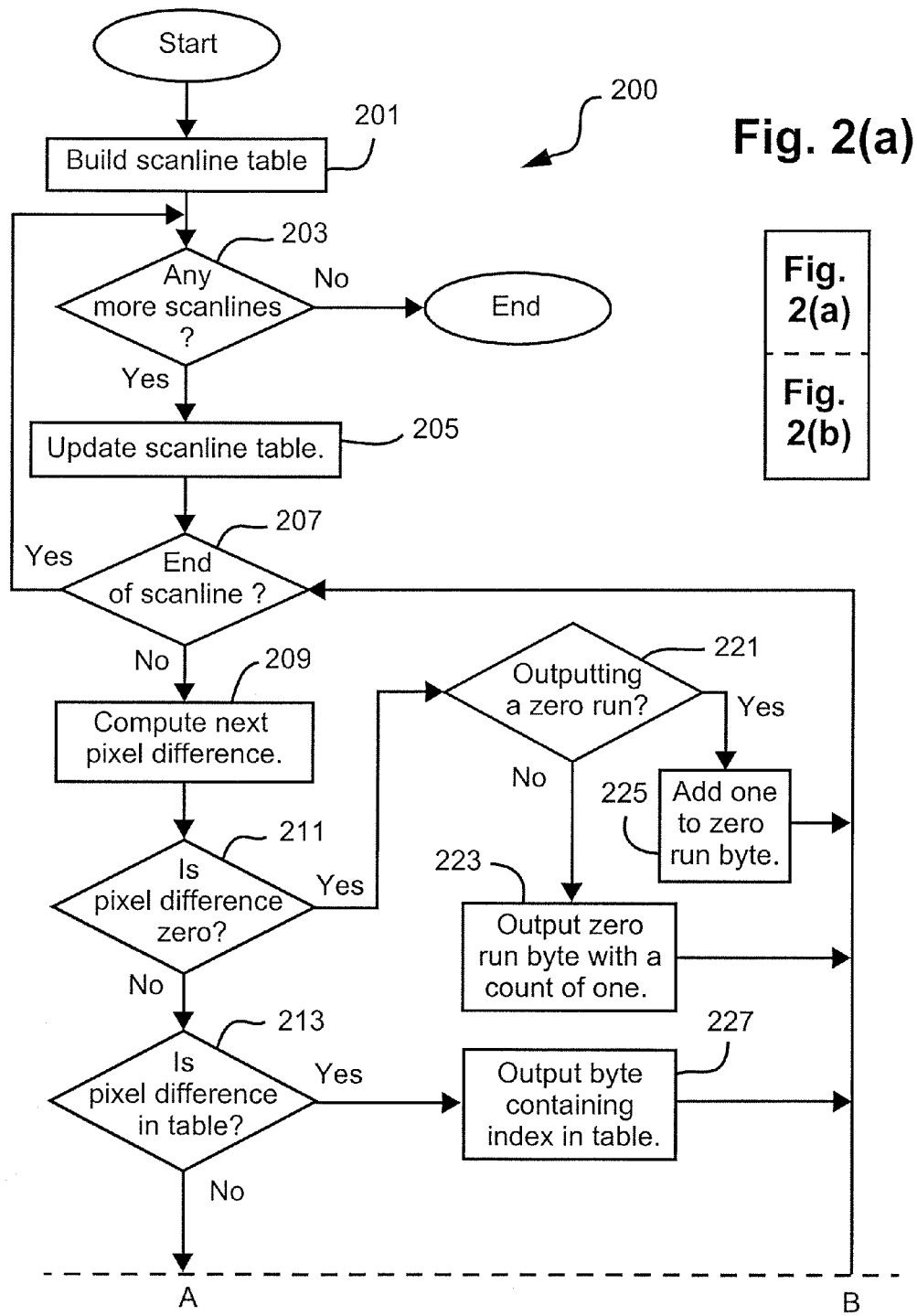
FIGS. 2(a) and 2(b) together comprise a flow diagram showing a method of compressing image data.
Figure 2B:
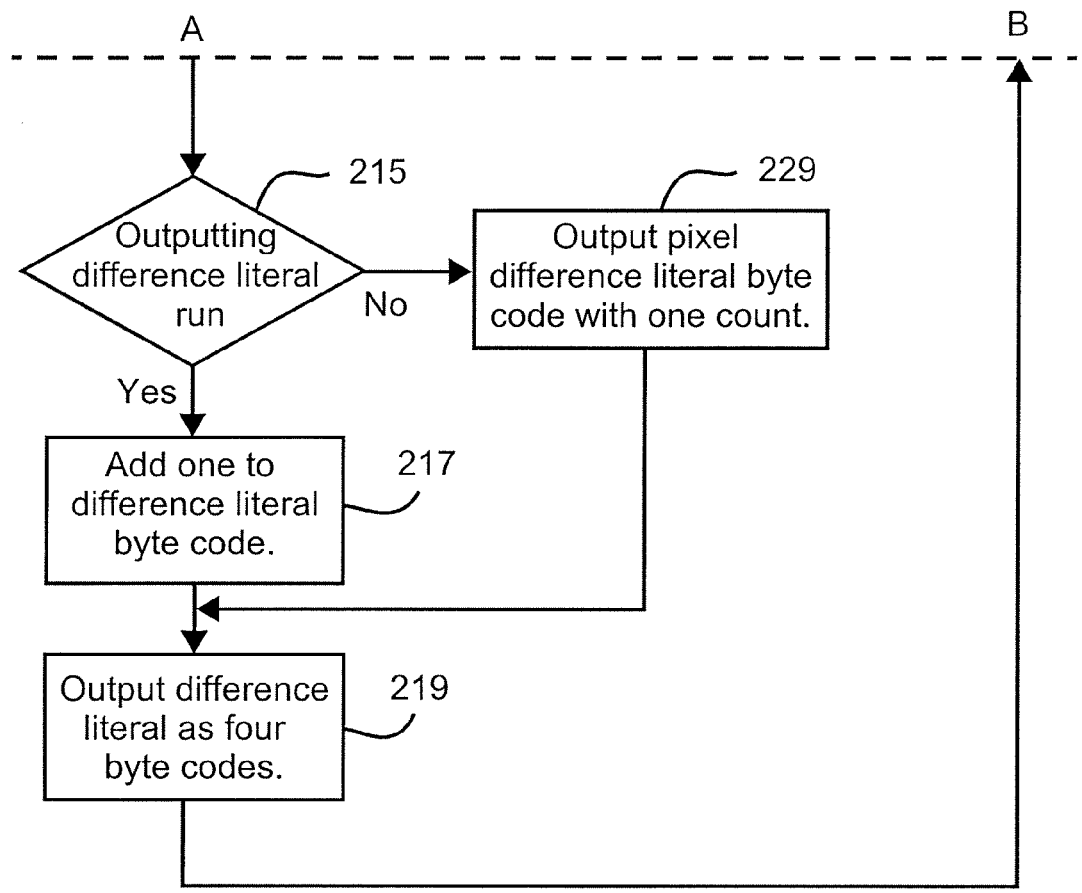
Figure 5:
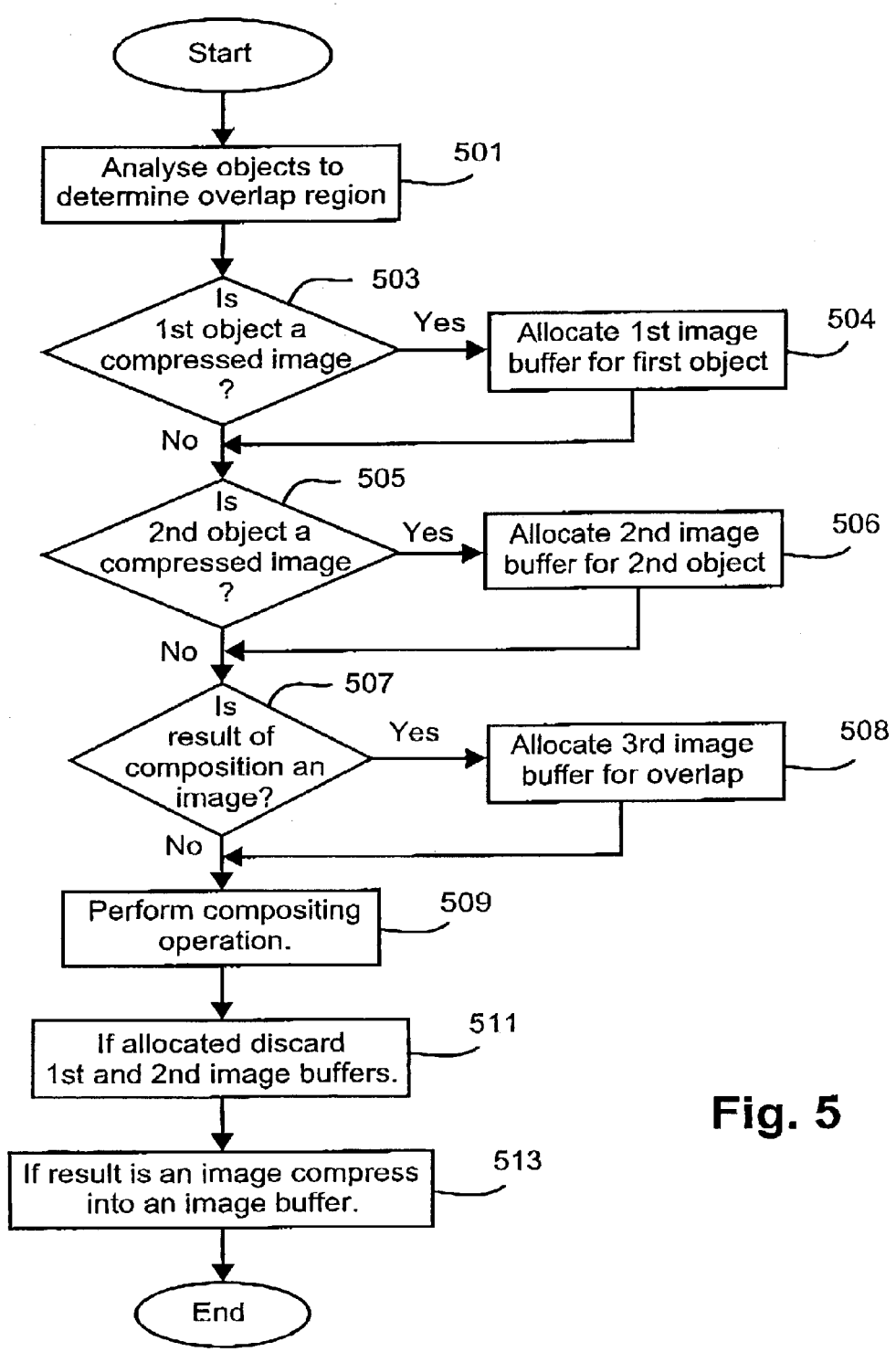
FIG. 5 is a flow diagram showing a method of compositing the graphical elements of FIG. 4.

The methods described herein are preferably practiced using a general-purpose computer system 100, such as that shown in FIG. 1 as wherein the processes of FIGS. 2, 3 and 5, may be implemented as software, such as an application program executing within the computer system 100. In particular, the steps of the methods 200, 300 and 500 are effected by instructions in the software that are carried out by the computer. The instructions may be formed as one or more code modules, each for performing one or more particular tasks. The software may also be divided into two separate parts, in which a first part performs the compression method and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for compressing image data.

The computer system 100 comprises a computer module 101, input devices such as a keyboard 102 and mouse 103, output devices including a printer 115 and a display device 114. A Modulator-Demodulator (Modem) transceiver device 116 is used by the computer module 101 for communicating to and from a communications network 120, for example connectable via a telephone line 121 or other functional medium. The modem 116 can be used to obtain access to the Internet, and other network systems, such as a Local Area Network (LAN) or a Wide Area Network (WAN).

The computer module 101 typically includes at least one processor unit 105, a memory unit 106, for example formed front semiconductor random access memory (RAM) and read only memory (ROM) input/output (I/O) interfaces including a video interface 107, and an I/O interface 113 for the keyboard 102 and mouse 103 and optionally a joystick (not illustrated), and an interface 108 for the modem 116. A storage device 109 is provided and typically includes a hard disk drive 110 and a floppy disk drive 111. A magnetic tape drive (not illustrated) may also be used. A CD-ROM drive 112 is typically provided as a non-volatile source of data. The components 105 to 113 of the computer module 101, typically communicate via an interconnected bus 104 and in a manner, which results in a conventional mode of operation of the computer system 100 known to those in the relevant art. Examples of computers on which the described arrangements can be practiced include IBM-PC's and compatibles, Sun Sparcstations or alike computer systems evolved therefrom.

Typically, the application program is resident on the hard disk drive 110 and is read and controlled in its execution by the processor 105. Intermediate storage of the program and any data fetched from the network 120 may be accomplished using the semiconductor memory 106, possibly in concert with the hard disk drive 110. In some instances, the application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable media. The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infra-red transmission channels as well as a network connection to another computer or networked device, and the Internet or Intranets including email transmissions and information recorded on websites and the like.

The methods 200, 300 and 500 may alternatively be implemented in dedicated hardware such as one or more integrated circuits performing the functions or sub functions of FIGS. 2, 3 and 5. Such dedicated hardware may include graphic processors, digital signal processors, or one or more microprocessors and associated memories.

Referring to FIG. 2, the method 200 of compressing image data representing an input image, begins at step 201, where the processor 105 allocates space in memory 106 for a scanline table. The scanline table is preferably configured as an array of 4-byte entries for storing an offset value representing the start of compressed data for each scan line of the image. The scanline table is stored at the start of a compressed data buffer, which is configured in memory 106 for storing the resulting compressed image data output stream, such that the layout of the resulting compressed image data output stream is a scanline table followed by the compressed image data. The scanline table is particularly useful for facilitating subsequent decompression of the image, as will be explained below.

In the following steps 203 to 229, of the method 200, the input image data is processed one scanline at a time. The offset for a resulting compressed scanline corresponding to an input scanline is stored at the start of the compressed data buffer. The corresponding scanline is then smoothed by determining 32-bit pixel differences, modulo $2^{32}$, between adjacent pixels of the input image data. The smoothed scan line is then searched for runs of zeroes and small differences in adjacent pixel values. As will be explained in detail below, the small differences are compared to predetermined small pixel difference values stored in a "small difference table" configured within the memory 106. Based on this comparison, a byte code is determined for the resulting compressed output stream.

The small difference table is preferably configured for 128 entries. Non-zero difference values are looked up in a pre-configured hash table, which contains indices into the 128-entry small difference table. The hash function is 'f(X)= (69621×X), modulo 225' and is chosen for maximum efficiency, where X represents a 32-bit pixel difference value. The difference values in the small difference table correspond to adjacent pixels in an input stream of pixel data, which change in value by a small amount. The small difference table contains 128 of the most commonly occurring differences. The difference values of the small difference table are those which arise from a difference of −2, −1, 0, +1 or +2 in each of the RGB colour channels of the adjacent pixels and in addition to the differences which arise from having a difference of −2, 1, 1 or 2 simultaneously in all four channels. This generates 128 distinct difference values as the value zero is excluded. If the pixel format is RGBA, where A represents the alpha channel, on a little endian computer architecture, for example, the differences equate to a 32-bit integer X as follows:

$r+g\times2^8+b\times2^{16}$ modulo $2^{32}$, where r, g, b represent the red, green and blue colour difference components of a pixel and range over the values −2, −1, 0, +1, +2; and $a\times(1+2^8+2^{16}+2^{24})$ modulo $2^{32}$, where a represents the alpha component of a pixel difference and ranges over the values −2, −1, +1, +2.

Table 1, below, shows 'Multiplier' and 'Modulus' hash function values, and corresponding count values (i.e., entries in the small difference table) for four example difference value implementations.

TABLE 1

| Multiplier Value | Modulus (little/big endian) | Count | Difference Value |
|---|---|---|---|
| 69621 | 225/325 | 128 | 5 × 5 × 5 × 1 |
| 16645254 | 231/ | 124 | 5 × 5 × 5 × 1 |
| 16645254 | 164/ | 80 | 3 × 3 × 3 × 3 |
| 16645254 | 329/ | 134 | 3 × 3 × 3 × 5 |

The first row of Table 1 shows the 'Multiplier Value' and little endian 'Modulus' values for the hash function, f(X)= (69621×X) mod 225 described above. For this hash function and a corresponding count of one-hundred and twenty-eight (i.e., one-hundred and twenty-eight entries in the small difference table)) there are five corresponding difference values which arise from a difference of −2, −1, 0, +1, +2 in each of the RGB colour channels of the adjacent pixels and in addition to the differences which arise from having a difference of −2, 1, 1 or 2 simultaneously in all four channels. There is also one difference value for the alpha channel.

The second row of Table 1 shows the 'Multiplier Value' and little endian 'Modulus' values for a hash function, f(X)=(16645254×X) mod 231. For this hash function and a corresponding count of one-hundred and twenty-four (i.e., one-hundred and twenty-four entries in the small difference table), there are five corresponding difference values (i.e., −2, −1, 0, +1, +2) for each of the RGB colour channels and one difference value for the alpha channel.

The third row of Table 1 shows the 'Multiplier Value' and little endian 'Modulus' values for a hash function, f(X)= (16645254×X) mod 164. For this hash function and a corresponding count of eighty (i.e. eighty entries in the small difference table), there are three corresponding difference values (i.e., −1, 0, +1) for each of the RGB colour channels and three difference values (i.e., −1, 0, +1) for the alpha channel.

Similarly, as seen in the fourth row of Table 1, for a count of one-hundred and thirty-four and a hash function, f(X)= (16645254×X) mod 329, there are three corresponding difference values (i.e., −1, 0, +1) for each of the RGB colour channels and five difference values (i.e., −2, −1, 0, +1, −2) for the alpha channel.

If the difference between two or more adjacent input pixels is zero, then a byte representing a run of zero-valued pixel differences is stored in the compressed data buffer to be output in the compressed output stream.

If the difference between two adjacent input pixels is found in the small difference table, then the difference between the two adjacent input pixels is stared in the compressed data buffer as a byte code in the compressed output stream. The byte code corresponds to the difference value in the small difference table. For example, if the difference value selected from the small difference table is +1, then the index corresponding to that difference value is stored in the compressed output stream. If the difference value is not found in the small difference table then the actual pixel difference value is stored, unchanged, in the compressed data buffer as a run of pixel literal values.

Accordingly, the compressed image data resulting from the method 200 is composed of a series of pixel runs each representing one or more pixel differences. Further, the first pixel in a run of consecutive pixel literals is preceded by a byte code indicating the length and type of the run. Three types of byte codes for the runs are defined, where the byte value range of a byte code determines the byte code type as follows:

(i) Type 1: byte value, 0 to 127, indicates an index into the small difference table;
(ii) Type 2: byte value, 128 to 191 indicates a run of (byte value−127) zero differences;
(iii) Type 3: byte value, 192 to 255 indicates a run of (byte value−191) literal differences. The type 3 byte code is followed by literal pixel difference values which are 4×(byte value −191) bytes long.

Again referring to FIG. 2, if the processor 105 determines that there are more input scanlines left to be processed, at step 203, then the method 200 proceeds to step 205. Otherwise, the method 200 concludes. At step 205, the offset corresponding to a next scanline is added to the scanline table. At the next step 207, if the processor 105 determines that the method 200 has reached the end of a current scanline then the method 200 returns to step 203. Otherwise, the method 200 proceeds to step 209, where the processor 105 determines a difference value representing the difference between a current input pixel and the previous input pixel. When determining the pixel difference value for the first input pixel of a scanline, there is no previous input pixel, so the previous input pixel value is set to zero.

If the difference value determined by the processor 105 is equal to zero, at step 211, then the method 200 proceeds to step 221. Otherwise, the method 200 proceeds to step 213. At step 221, if the processor 105 determines that a previous byte code stored in the compressed data buffer, for the current input scanline, was a zero run byte (i.e. type 2) having an associated count value of less than sixty four, then the method 200 proceeds to step 225, where the previous zero run byte code is incremented by one. The count value associated with a type 2 byte code indicates the number of pixels in the 32-bit zero value pixel run which is represented by the type 2 byte code. Otherwise, the method 200 proceeds to step 223 where a zero run byte code is stored in the compressed data buffer, by the processor 105, with a count of one indicating one 32-bit zero value pixel run. After step 223, the method 200 returns to step 207.

The method 200 continues at the next step 213, where if the processor 105 determines that the pixel difference value determined at step 209 is in the small pixel difference table, then the method 200 proceeds to step 227. Otherwise, the method 200 proceeds to step 215. At step 227, the processor 105 outputs a byte code corresponding to the index in the small difference table of the calculated pixel difference value. The byte is output to the compressed data buffer and the method 200 returns to step 207.

If the processor 105 determines at step 215, that the previous byte code stored in the compressed data buffer was a literal difference byte (i.e. type 3) having an associated count value of less than the value sixty four, then the method 200 proceeds to step 217 where the literal run byte code is incremented by one and the method 200 proceeds to step 219. Otherwise the method 200 proceeds to step 229. The count value associated with a type 3 byte code indicates the number of four byte literal pixel values represented by the type 3 byte code. At step 229, the processor 105 stores a literal difference value byte code with a count of one, in the compressed data buffer and the method 200 proceeds to step 219. At step 219, the processor 105 outputs four bytes whose value is equal to the pixel difference determined at step 209. After step 219, the method 200 returns to step 207 and the remaining scanlines are processed for the image in the same manner.

If the volume of compressed data resulting from the method 200 is not sufficiently less than the volume of the original input data then the compressed data can be discarded. This decision can be made on the basis of a threshold value (e.g. 60% compression).

Figure 6:
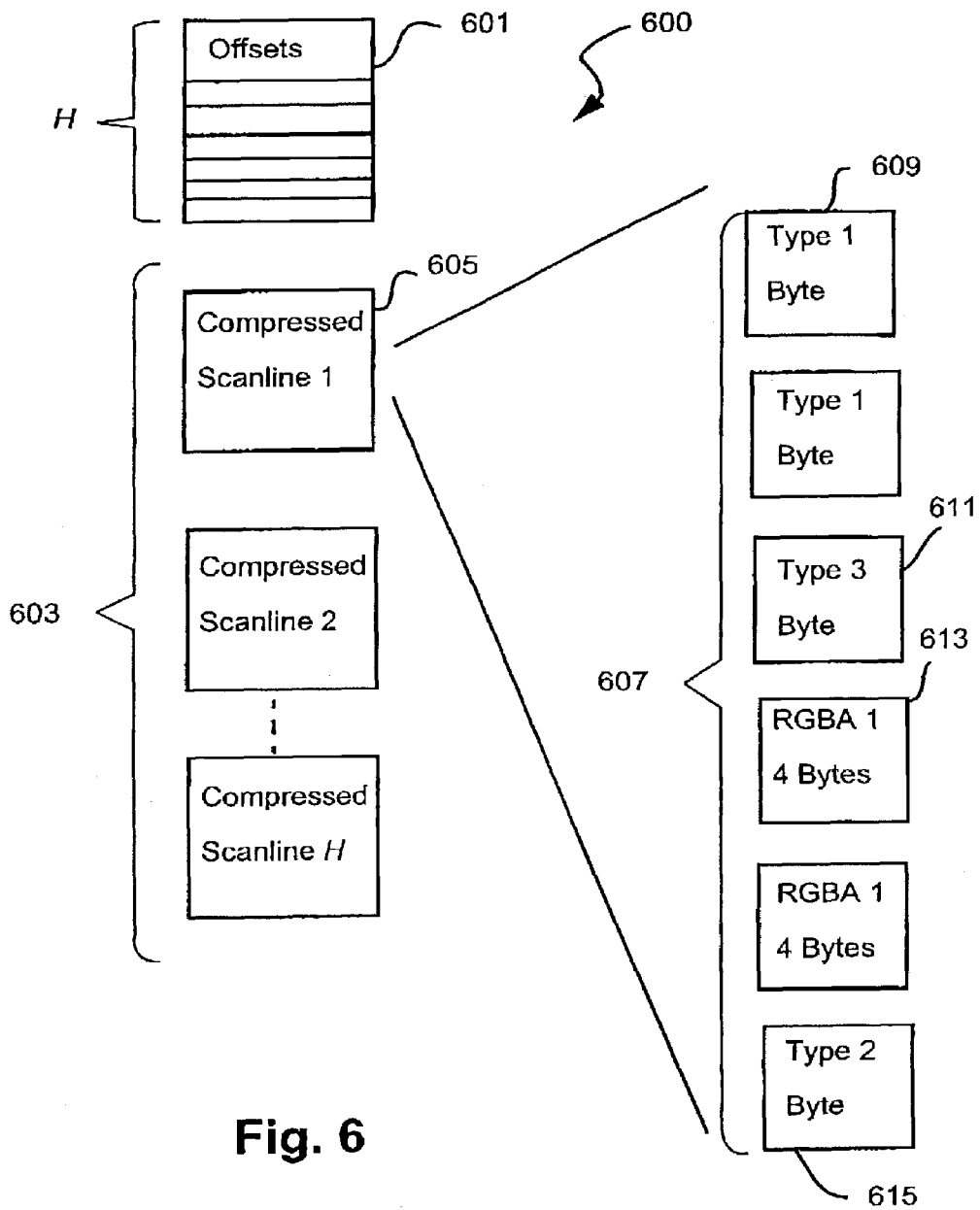
FIG. 6 shows an example of a compressed image data output stream.
Figure 7:
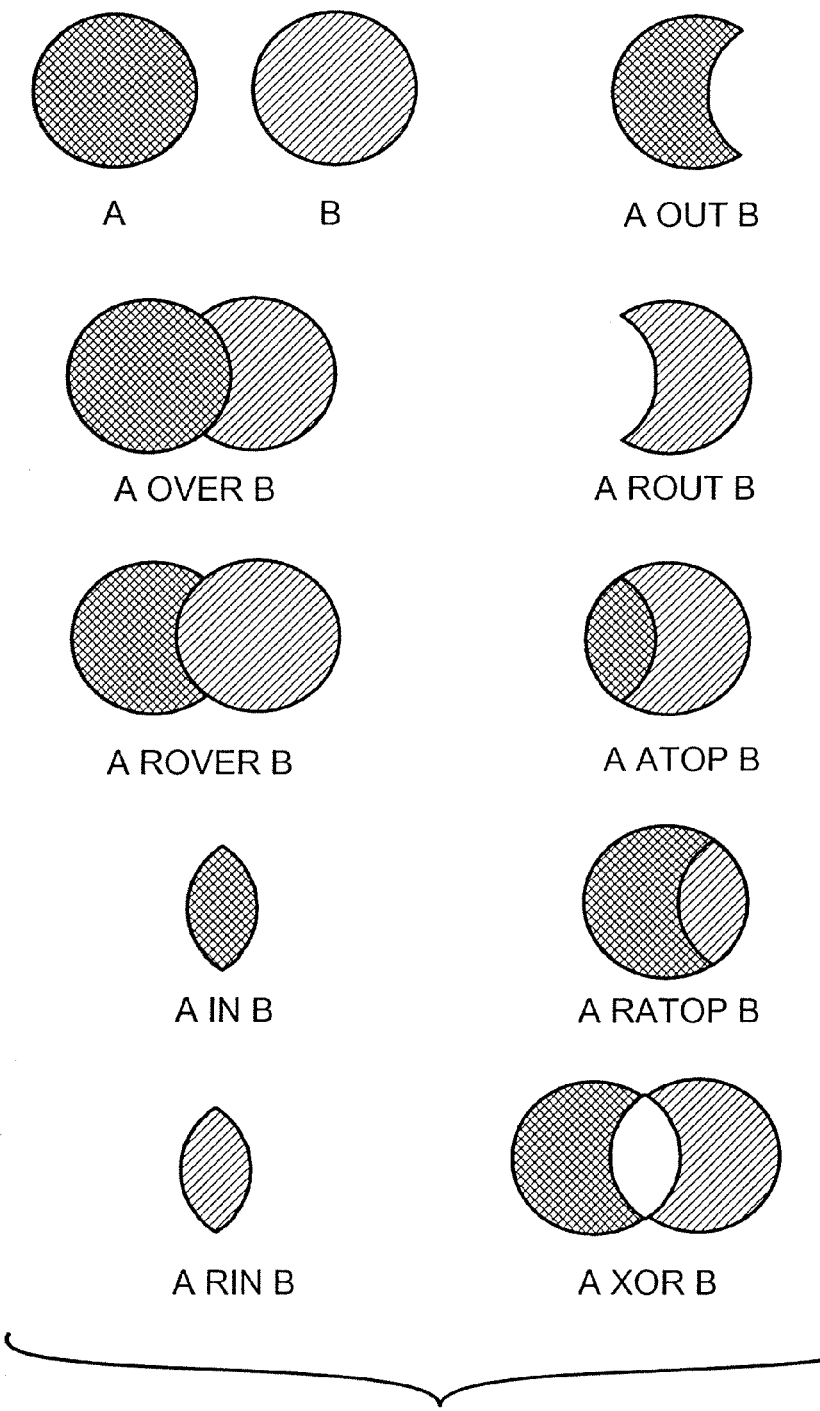
FIG. 7 shows the result of a variety of compositing operators useful with the described arrangements.
Figure 8:
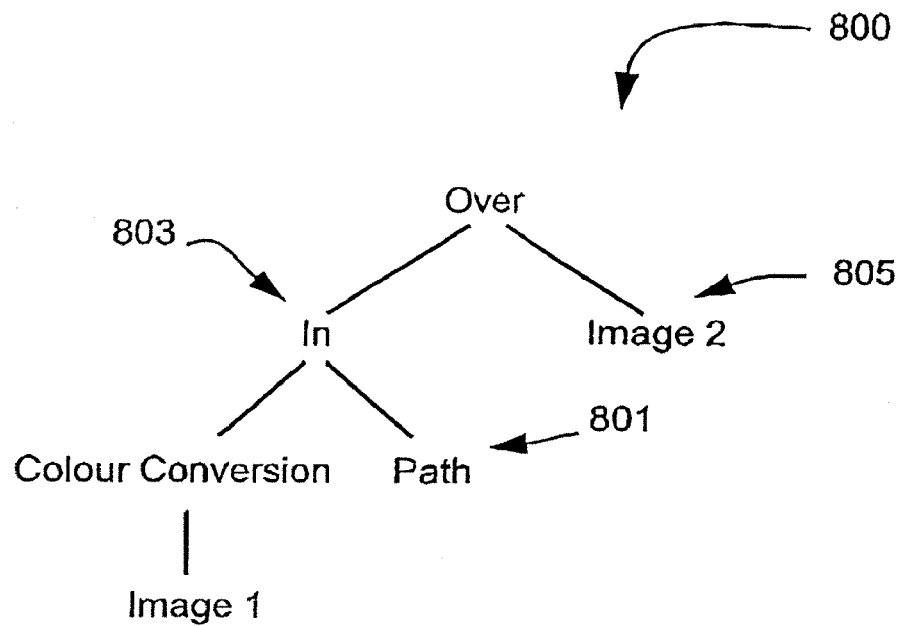
FIG. 8 is an example of a compositing tree.

FIG. 6 shows an example of a compressed image data output stream 600 for an image which is W pixels wide by H scanlines high. The output stream 600 comprises a scanline table 601 which is configured to store H offsets. The table 601 is followed by H compressed scanlines 603, which comprise one or more byte codes depending on the number of pixels, W, and on the pixel runs of a corresponding scanline. For example, the first compressed scanline 605 may comprise six byte codes 607. The first byte code 609 may, be a type 1 byte code having a value of three, representing the third entry in an associated small pixel difference table. Therefore, the difference value between zero and the first pixel of the first input scanline is equal to a corresponding value stored in the third entry of the small pixel difference table.

The third byte code 611 of the bate codes 607 may be a type 3 byte code having a value equal to '193' indicating that the byte code 611 is followed by two 32 bit literal pixel difference values. Therefore, the value of the 32 bit (i.e. 4 byte) code 613 indicates the actual difference value between the second and the third pixels of the first input scanline.

The byte code 615 of the byte codes 607 may be a type 2 byte code having a value of '129'. Therefore, byte code 615 represents two zero pixel differences such that the difference between both the fifth and sixth, and the sixth and seventh pixels of the input pixel stream is zero, indicating a flat colour pixel run.

Referring to FIG. 3, the method 300 of decompressing image data, representing an image which was compressed according to the method 200, begins at step 301 where an initial compressed scanline is located using a scanline table contained in a compressed image data buffer containing the compressed image. The method 300 decompresses scanlines associated with a rectangular portion of the compressed image. The rectangular portion typically includes the intersection of graphical elements representing a part of an image and is determined by drawing a bounding box, as known to those in the relevant art, around the region representing the intersection of the graphical elements. However, such a rectangular portion can contain the entire image. The manner in which such a rectangular portion is selected in a retained mode rendering system, utilising the method 300, will be explained in detail below with reference to FIGS. 4 and 9.

At the next step 302 of the method 300, the processor 105 sets a nominal current pixel value stored in memory 106 to zero. Then at the next step 303, the processor 105 examines a first compression byte code of the initial compressed scanline to determine which of the three types of pixel run (i.e. type 1, type 2 or type 3 as described above), the compression byte code represents. If the processor 105 determines that the compression byte code is a type 1 byte code, at the next step 305 then the method 300 proceeds to step 309. Otherwise, the method 300 proceeds to step 307.

At step 309, the processor 105 converts the type 1 compression byte code to a pixel difference value by using the byte code as an index into the small difference table. At the next step 310, the pixel difference value determined at step 309 is added to the current pixel value stored in memory 106. Then at the next step 312, the processor 105 outputs the current pixel value to an output frame buffer configured within memory 106 and the method 300 proceeds to step 317. Thus, the pixel value stored in the frame buffer at step 312 is an uncompressed representation of the type 1 compression byte code At step 307, if the processor 105 determines that the compressed byte code is a type 2 byte code, then the method 300 proceeds to step 314. Otherwise, the byte code is type 3 byte code and the method 300 proceeds to step 313. At step 313, any 4 byte codes following the type 3 compressed byte code are stored in memory 106 as literal pixel difference values. Then at the next step 316, the processor 105 adds each of the literal pixel differences stored in memory 106 at step 313, to the current pixel value and outputs the current pixel value to the output frame buffer. Following step 316, the method 300 proceeds to step 317.

At step 314, the processor 105 writes one or more 32 bit pixel values to the output frame buffer. The value represented by each of the 32 bit pixel values is equal to the current pixel value. The number of pixels written to the ouput frame buffer is indicated by the type 2 byte code.

If there are any more compressed bytes to be processed for the current scanline, at step 317, then the method 300 returns to step 303. Otherwise, the method 300 proceeds to next step 323. At step 323, if any more compressed scanlines are required to be processed then the method 300 returns to step 301 Otherwise, the method 300 concludes. The image represented by the decompressed image data in the frame buffer can be subsequently rendered on the printer 115 or display 114.

Figure 9:
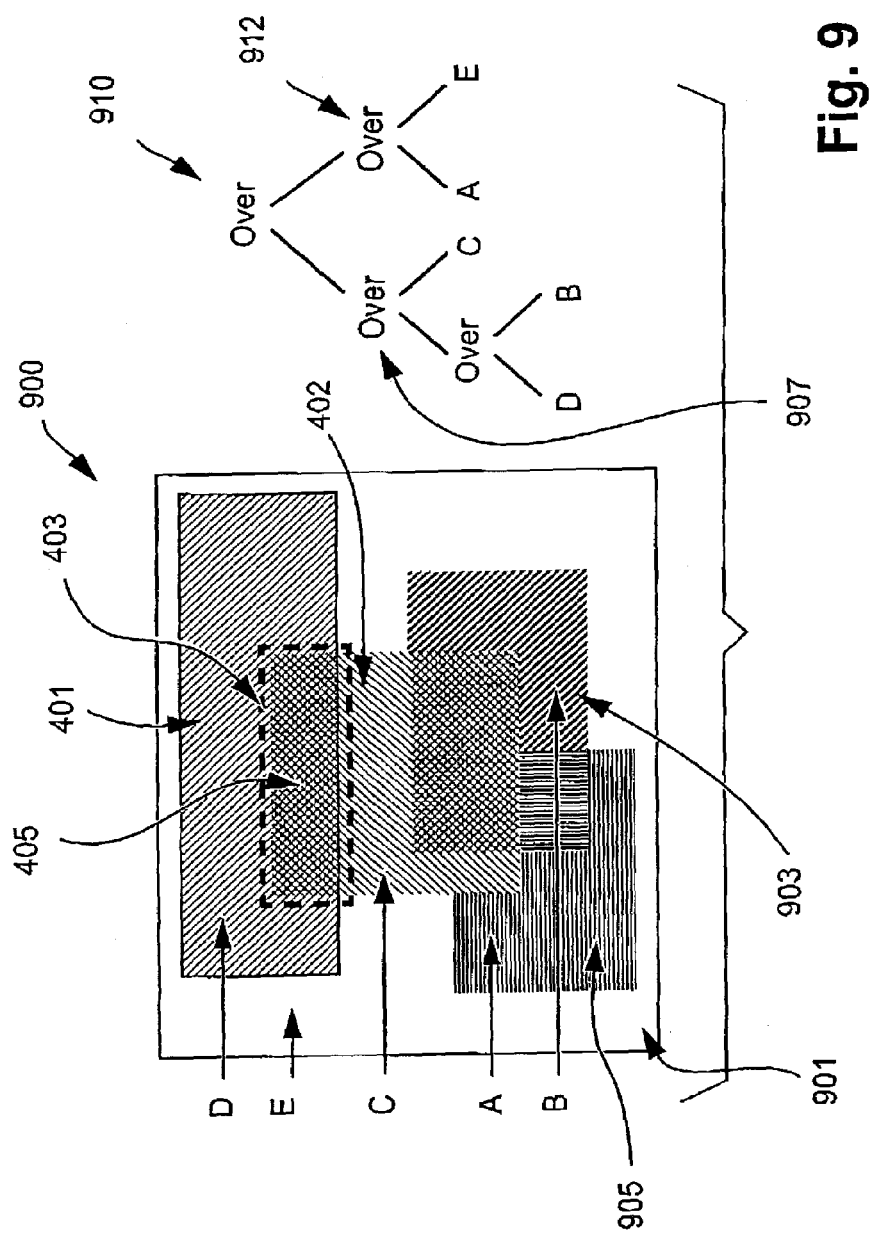
FIG. 9 shows an image containing a number of overlapping objects and a corresponding compositing tree.

A method 500 of compositing graphical elements will now be explained by way of example, with reference to FIGS. 4, 5 and 9. The method 500 uses the compression method 200 and decompression method 300 and will be explained with reference to a retained mode rendering system as described above.

Figure 4:
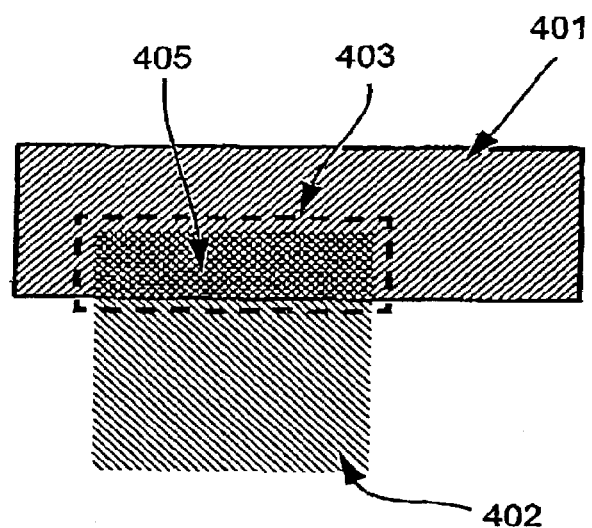
FIG. 4 shows two intersecting graphical elements.

Referring to FIG. 4, when two (or more) graphical elements (e.g. rectangular shaped object 401 and object 402) are composited together, and at least one of those graphical elements is an image (e.g. object 401) compressed according to the method 200, any portion of the compressed image object 401 which is required to complete the rendering of the object 401 and 402, can be decompressed prior to a required compositing operation (i.e. over in this example) being performed. The decompression is performed by determining a smallest rectangle 403 or bounding box (shown by phantom lines in FIG. 4), which includes the intersection region 405 of graphical objects 401 and 402. A person skilled in relevant art would appreciate that in the case of the region 405, such a bounding box 403 would substantially follow the boundary of the intersection region 405.

The smallest rectangle 403 can be determined, by the processor 105, by traversing a compositing tree representing the composition of the two graphical objects 401 and 402 and then selecting the intersection region 405 which is stored at the parent node of the two leaf nodes representing the graphical objects 401 and 402. For example, FIG. 9, shows an image 900 comprising the graphical objects 401 and 402, and three other overlapping graphical objects 901, 903 and 905. FIG. 9 also shows a compositing tree 910 corresponding to the image 900. For ease of explanation, the objects 401, 402, 901, 903 and 905 are also given the labels D, C, E, B and A, respectively, as indicated in FIG. 9. The smallest rectangle 403 can be determined, by the processor 105, by traversing the compositing tree 910 corresponding to the image 900 and then selecting the region 405 which is represented by the node 907 of the compositing tree 910. A bounding box 403 is then determined, by the processor 105, for the region 405 stored at node 907. The manner in which such a region 405 is represented and stored at the node 907, in the methods 200, 300 and 500 described herein, will be explained in further detail below.

In the present example, in order to composite the objects 401 and 402 of the image 900, the scan lines (not shown) in object 401, which intersect the rectangle 403, are decompressed, according to the method 300, into a temporary buffer configured within memory 106. In addition, if object 402 is a compressed image then the scan lines in object 402, which intersect rectangle 403, are decompressed, according to the method 300, into another temporary buffer configured within memory 106. A required compositing operation is then performed using the data defined by the decompressed scanlines stored in the temporary buffers and the temporary image buffers are subsequently discarded. If the result of the compositing operation is an image which is required for a subsequent redraw operation, then the resulting image is also compressed into a compressed image buffer, according to the method 200, and the compressed image buffer is subsequently discarded after the redraw operation.

Accordingly, only the scanlines which are required to complete the rendering of the image 900 are decompressed into a temporary buffer. For example, if any of the objects 401, 402, or 903 are opaque (determined from an alpha channel associated with these objects 401, 402 and 903) then there is no requirement to decompress any scanlines associated with any region containing the intersection of these opaque objects 401, 402 and 903, and the objects 901 and 905, since any such region is hidden in the final image. Decompression of such hidden regions would only reduce the processing advantages gained by the methods 200 and 300 described herein, since processing would be performed on regions not required to render the image 900.

The regions which are required to complete the rendering of an image and are thus required to be decompressed into a temporary buffer, can be selected by traversing a compositing tree (e.g. the compositing tree 910) corresponding to the image and then using an alpha channel associated with such regions and associated child graphical elements to determine whether the region is visible in the final rendered image.

Referring to FIG. 5, the method 500 of compositing the objects 401 and 402 begins at step 501, where the processor 105 analyses the objects 401 and 402 to determine the overlap (or intersection) region 405 and then draws a bounding box around the region 405 to determine the smallest rectangle 403. At the next step 503, if the processor 105 determines that the object 401 is a compressed image then the method 500 proceeds to step 504. Otherwise, the method 500 proceeds to step 505. At step 504, the processor 105 allocates a first image buffer within memory 106. Also at step 504, the scan lines in object 401 which intersect rectangle 403 are decompressed according to the method 300, and decompressed data corresponding to the scan lines are stored in the first image buffer. As described above, the smallest rectangle 403 can be determined, by the processor 105, by traversing the compositing tree 910 corresponding to the image 900, selecting the intersection region 405, represented by the rectangle 403, stored at node 907 of the compositing tree 910, and then determining a bounding box for the selected region.

At the next step 505, if the processor 105 determines that object 402 is a compressed image, then the method 500 proceeds to step 506 Otherwise, the method 500 proceeds to step 507. At step 506, the processor 105 allocates a second image buffer within memory 106. Also at step 506, the scan lines in object 402, which intersect the rectangle 403, are decompressed according to the method 300 and are stored in the second image buffer.

The method 500 continues at the next step 507, where if the result of the composition of the objects 401 and 402 is an image, then the method 500 proceeds to step 508. Otherwise, the method 500 proceeds to step 509. At step 508, the processor 105 allocates a third image buffer, within memory 106, large enough to store the uncompressed image data corresponding. To the rectangle 403. At step 509, the processor 105 performs the compositing operation (i.e. object 401 over object 402) using the decompressed image data stored in the first and second image buffers. The over operation uses alpha channels associated with both of the objects 401 and 402 to determine the resulting image data representing the composition. At the next step 511, the first and second image buffers are discarded. The method 500 concludes at the next step 513, where if the result of the compositing operation performed at step 509 is an image, then the image is compressed, according to the method 200, using the decompressed data contained in the third image buffer. The resulting compressed output stream can be written to a compressed image buffer configured within memory 106, and the third image buffer can be discarded.

The remaining objects 901, 903 and 905 can also be composited according to the method 500, as described above for objects 401 and 402.

Although the method 500 was described above with reference to the over operation, the method 500 is independent of the compositing operation associated with a smallest rectangular region (e.g. the rectangle 403) to be rendered, since the scanlines associated with the smallest rectangular region are decompressed prior to the compositing operation being performed on the data associated with the smallest rectangular region 403.

When storing regions representing graphical objects at the nodes of a compositing tree, there is a trade-off between how closely region boundaries follow graphical object boundaries and the benefits obtained. If region boundaries follow object boundaries very closely, a lot of work is usually involved in creating the region boundaries and in performing intersections and differences of regions. However, if region boundaries are too approximate the region boundaries may either include large areas that are outside an objects' boundaries, resulting in too much unnecessary compositing, or the region boundaries may fail to include large areas of an object.

Region boundaries can be limited to sequences of horizontal and vertical segments. The segment size can be chosen so that there is neither too much detail so that the region operations are overburdened, nor too much approximation to result in wasted compositing One method to improve the efficiency of region operations is to choose as many as is practical of the horizontal and vertical segments of substantially all region boundaries to be in phase. The horizontal and vertical segments are preferably chosen from the horizontal and vertical lines of the same grid. The grid need not be regularly spaced, nor have the same spacing horizontally and vertically.

Figure 10:
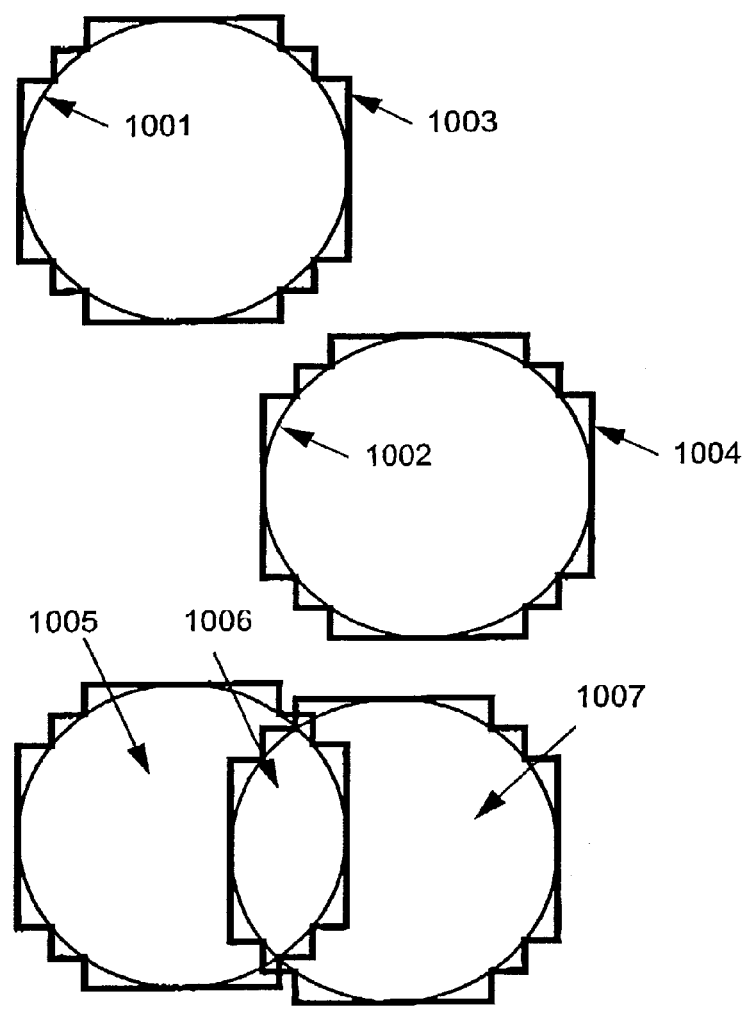
FIG. 10 shows regions formed by combining two circles with non-grid-aligned regions.
Figure 11:
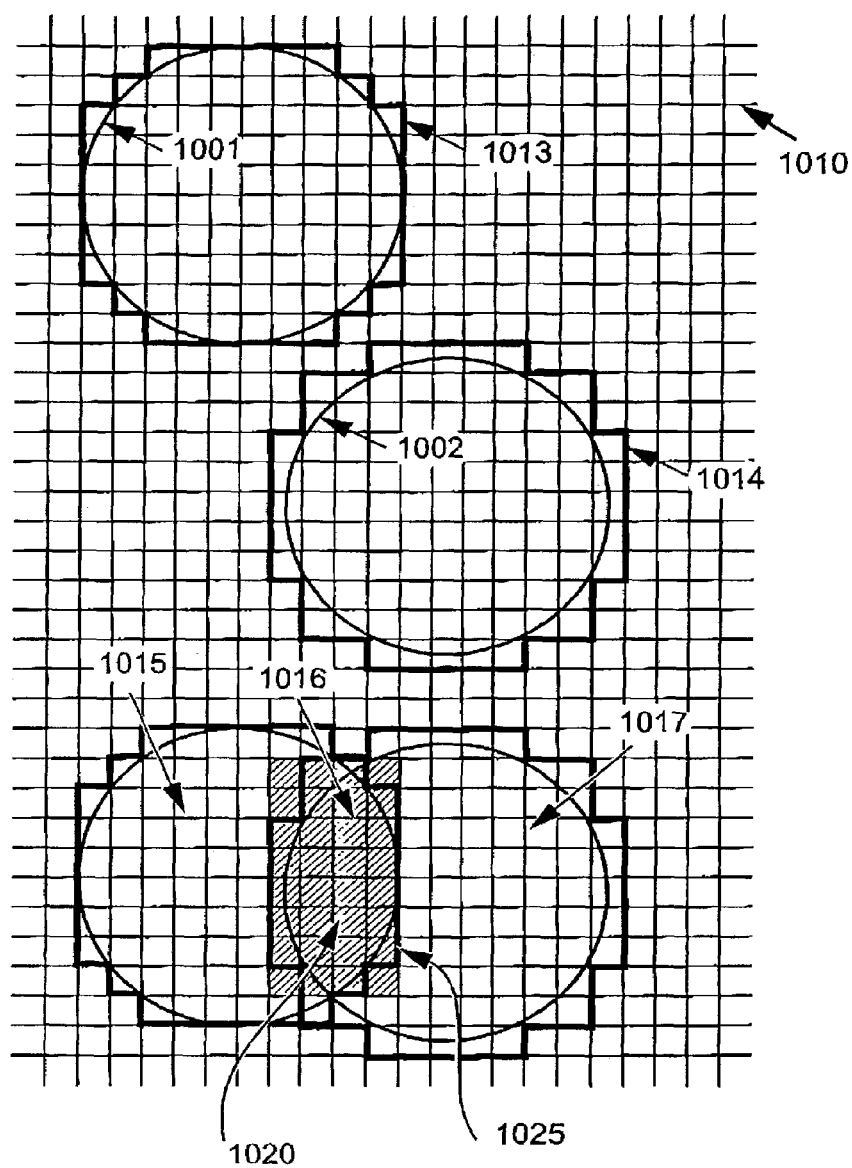
FIG. 11 shows regions formed by combining two circles with grid-aligned regions.

Choosing the horizontal and vertical segments from the horizontal and vertical lines of the same grid improves the efficiency of region operations (i.e. compositing, operations) by seeking to keep all region boundary detail to the level of detail contained in the underlying grid. Without constraining the majority of region boundary segments to a grid, region operators such as difference and intersection tend to produce a lot more fine detail. For example, in FIG. 10, two circles 1001 and 1002 are shown with respective regions 1003 and 1004 that are not grid-aligned. These circles are overlapped yielding difference regions 1005 and 1007, and intersection region 1006. In FIG. 11, the same circles 1001 and 1002 have regions 1013 and 1014 that are aligned to grid 1010. These circles are overlapped yielding difference regions 1015 and 1017 and intersection region 1016. It can be seen in the example of FIGS. 10 and 11 that the grid-aligned regions yield less detailed results at the expense of slightly less efficient region coverage. Regions 1005, 1006 and 1007 together contain a total of sixty segments, while regions 1015, 1016 and 1017 together contain only fifty-two.

Accordingly, a smallest rectangular region of an image to be decompressed in the methods described above, is preferably determined according to a grid (e.g. the grid 1010), in the manner described above. For example, as seen in FIG. 11, the smallest rectangular region 1020 (shown shaded in FIG. 11) representing the intersection region 1016 is determined according to the grid 1010. Alternatively, in a further arrangement of the present invention, the region 1025 represented by the thick dark lines surrounding the intersection region 1016 of the circles 1001 and 1002 can be determined and subsequently decompressed, in accordance with the method 300, in order to perform a compositing operation on the circles 1001 and 1002. The region 1025 is aligned to the grid, although the region 1025 is not rectangularly shaped.

In one arrangement of the present invention, the data model used to represent regions (e.g. the intersection region 405) corresponding to the nodes of a compositing tree (e.g. the compositing tree 910) consists of a region description and a proxy. Each region of a compositing tree has at least the following associated data:

(i) A Region Description: A low-level representation of the boundaries of the region. The region descriptions of all the regions are mutually exclusive (non-intersecting, non-overlapping); and (ii) A Proxy: Some means of caching the pixel data resulting from applying a compositing operation specified by the compositing expression at every pixel inside the region description. A proxy can be a 24 bit colour bit-map, or a run-length encoded description, for example. A proxy represents pixel data in a manner which makes the pixel data efficient to retrieve and use.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequential.

The method described above, provides a very fast and lossless compression method which can be integrated into a graphical composition process in a retained-mode renderer.

The foregoing describes only some embodiments of the present invention, and modifications and/or changes can be made thereto without departing from the scope and spirit of the invention, the embodiments being illustrative and not restrictive. For example, a person skilled in the relevant art would appreciate that the methods 200, 300 and 500 can be applied to any number of graphical elements.

The claims defining the invention are as follows:

1. A computer implemented method of compositing a plurality of graphical objects according to a predetermined compositing operation, at least one of the graphical objects being in the form of a compressed representation, the compressed representation comprising one or more coded pixel runs each representing one or more pixel difference values, each of the coded pixel runs having an associated byte code indicating a type for the associated coded pixel run, said method comprising the steps of:

decompressing at least one coded pixel run of the compressed representation by:

examining the byte code associated with the coded pixel run to determine the type of the coded pixel run; and determining pixel values for the coded pixel run, depending upon the type of the coded pixel run, using the pixel difference values represented by the coded pixel run; and compositing at least a portion of the pixel values determined for the compressed representation with pixel values for at least another one of the graphical objects, in accordance with the predetermined compositing operation, to determine one or more runs of composited pixel values representing the composited graphical objects.

2. The method according to claim 1, further comprising the steps of, for each run of composited pixel values:

determining pixel difference values between each adjacent pixel of the run of composited pixel values;

comparing the determined pixel difference values for the run of composited pixels to predetermined difference values using a predetermined hash function;

determining one or more coded pixel runs for the run of composited pixel values depending on the comparison, each of the coded pixel runs representing a difference value between at least two adjacent pixels of the run of composited pixel values; and storing the one or more coded pixel runs as a compressed representation of the run of composited pixel values.

3. The method according to claim 1, wherein a first type of coded pixel run represents an index into a small difference table.

4. The method according to claim 1, wherein a second type of coded pixel run represents a run of zero pixel difference values.

5. The method according to claim 1, wherein a third type of coded pixel run represents a run of literal pixel difference values.

6. The method according to claim 1, wherein the portion of the pixel values determined for the compressed representation falls within a region drawn around a region of intersection of at least two of the graphical objects.

7. The method according to claim 6, wherein the region is determined by:

traversing a compositing tree representing the composition of the at least two graphical objects; and selecting the region of intersection stored at a parent node of two leaf nodes representing the at least two graphical objects.

8. The method according to claim 6, wherein the region of intersection is bounded by sequences of horizontal and vertical segments.

9. The method according to claim 8, wherein the horizontal and vertical segments are selected from horizontal and vertical segments of a grid.

10. An apparatus for compositing a plurality of graphical objects according to a predetermined compositing operation, at least one of the graphical objects being in the form of a compressed representation, the compressed representation comprising one or more coded pixel runs each representing one or more pixel difference values, each of the coded pixel runs having an associated byte code indicating a type for the associated coded pixel run, said apparatus comprising:

decompressing means for decompressing at least one coded pixel run of the compressed representation by:

examining the byte code associated with the coded pixel run to determine the type of the coded pixel run; and determining pixel values for the coded pixel run, depending upon the type of the coded pixel run, using the pixel difference values represented by the coded pixel run; and compositing means for compositing at least a portion of the pixel values determined for the compressed representation with pixel values for at least another one of the graphical objects, in accordance with the predetermined compositing operation, to determine one or more runs of composited pixel values representing the composited graphical objects.

11. A computer program product including a computer storage medium having recorded thereon a computer program for compositing a plurality of graphical objects according to a predetermined compositing operation, at least one of the graphical objects being in the form of a compressed representation, the compressed representation comprising one or more coded pixel runs each representing one or more pixel difference values, each of the coded pixel runs having an associated byte code indicating a type for the associated coded pixel run, said program comprising:

code for decompressing at least one coded pixel run of the compressed representation by:
  examining the byte code associated with the coded pixel run to determine the type of the coded pixel run; and
  determining pixel values for the coded pixel run, depending upon the type of the coded pixel run, using the pixel difference values represented by the coded pixel run; and code for compositing at least a portion of the pixel values determined for the compressed representation with pixel values for at least another one of the graphical objects, in accordance with the predetermined compositing operation, to determine one or more runs of composited pixel values representing the composited graphical objects.

* * * * *

UNITED STATES PATENT AND TRADEMARK OFFICE
CERTIFICATE OF CORRECTION

| | | |
|---|---|---|
| PATENT NO. | : 7,184,599 B2 | |
| APPLICATION NO. | : 10/391605 | |
| DATED | : February 27, 2007 | |
| INVENTOR(S) | : Gregg Richard Kelly | |

It is certified that error appears in the above-identified patent and that said Letters Patent is hereby corrected as shown below:

ON THE TITLE PAGE [73] ASSIGNEE:

"Canon Kabushiki Kaisha, Toky (JP)" should read --Canon Kabushiki Kaisha, Tokyo (JP)--.

ON THE TITLE PAGE [57] ABSTRACT:

Line 6, "pixels" (first occurrence) should read --pixel--.

SHEET 4:

Figure 3, "run of current pixel value" should read --run of current pixel values--.

COLUMN 2:

Line 58, "composting" should read --compositing--.

COLUMN 3:

Line 48, "pan" should read --part--.

COLUMN 6:

Line 4, "an," should read --any--.

COLUMN 9:

Line 29, "stared" should read --stored--; and
Line 21, "values (i.e., -2, -1, 0 +1, -2" should read --values
(i.e., -2, -1, 0 +1, +2--.

COLUMN 10:

Line 59, "may," should read --may--; and
Line 65, "bate" should read --byte--.

UNITED STATES PATENT AND TRADEMARK OFFICE
CERTIFICATE OF CORRECTION

PATENT NO. : 7,184,599 B2
APPLICATION NO. : 10/391605
DATED : February 27, 2007
INVENTOR(S) : Gregg Richard Kelly It is certified that error appears in the above-identified patent and that said Letters Patent is hereby corrected as shown below:

COLUMN 12:

Line 2, "step 301" should read --step 301.--;
Line 18, "object" should read --objects--.

COLUMN 13:

Line 41, "step 506Otherwise," should read --step 506. Otherwise,--; and
Line 53, "corresponding. To" should read --corresponding to--.

COLUMN 14:

Line 20, "objects'" should read --object's--.

COLUMN 15:

Line 7, "composting" should read --compositing--;
Line 23, "departing" should read --departing from--; and
Line 25, "rather sequential." should read --rather than sequentially.--.

Signed and Sealed this

Sixth Day of January, 2009

JON W. DUDAS
*Director of the United States Patent and Trademark Office*